Oct. 19, 1926.
J. M. CALKINS
1,603,315
DIRIGIBLE HEADLIGHT FOR VEHICLES
Filed Dec. 15, 1924
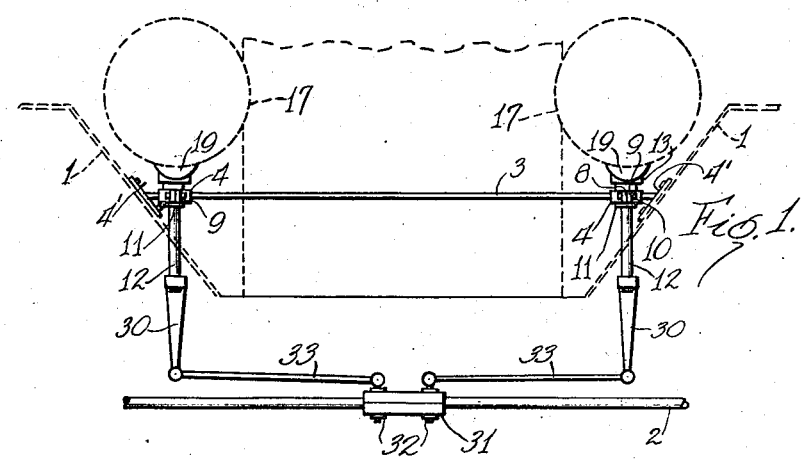
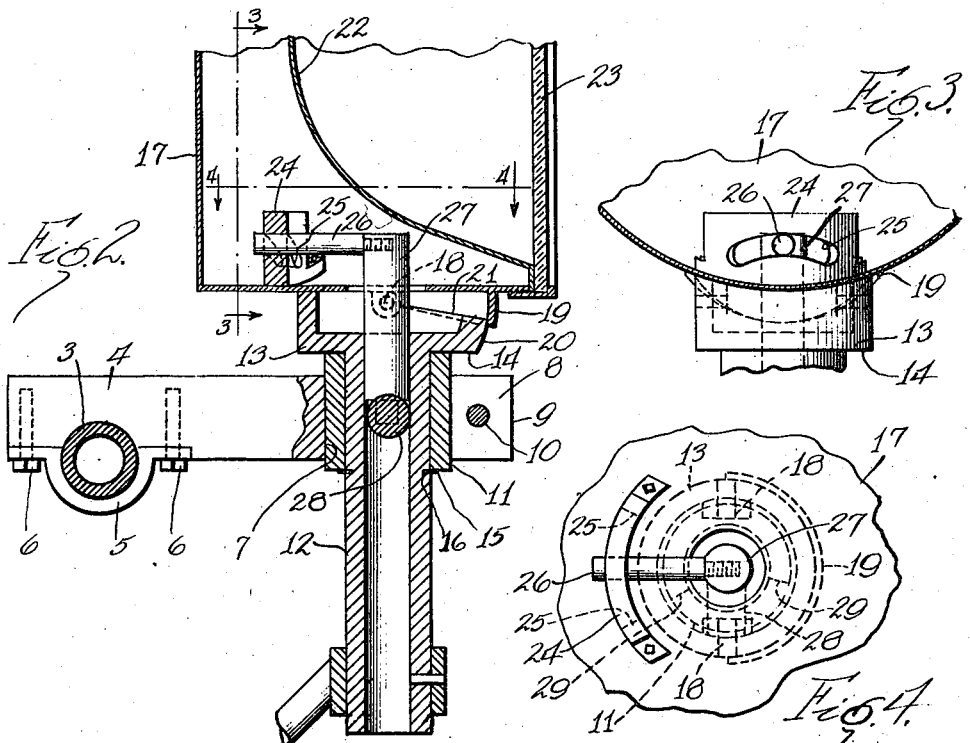
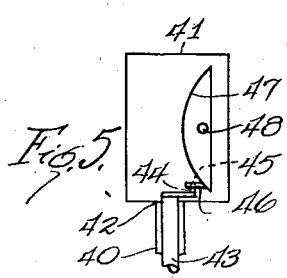
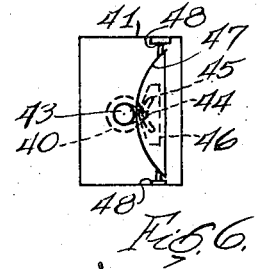
INVENTOR
J. M. CALKINS
BY Munn & Co
ATTORNEYS Patented Oct. 19, 1926.

1,603,315

UNITED STATES PATENT OFFICE.

JAMES M. CALKINS, OF PEORIA, ILLINOIS, ASSIGNOR TO SCOTT HEAD LAMP CONTROL, OF MIAMI, FLORIDA, A CORPORATION OF FLORIDA.

DIRIGIBLE HEADLIGHT FOR VEHICLES.

Application filed December 15, 1924. Serial No. 756,017.

My invention relates to improvements in dirigible headlights for vehicles, and it consists in the combinations, constructions, and arrangements herein described and claimed.

An object of my invention is to provide a dirigible headlight for vehicles in which the headlights themselves house the means for swinging the headlights with the wheels, and for tilting the headlights forwardly when the headlights are swung.

A further object of my invention is to provide a dirigible headlight for vehicles in which the pivotal point of the headlights with the supporting means is disposed adjacent to the under side of the headlight casing, whereby the headlight may be more readily swung than is the case when the pivot point is disposed quite a distance from the headlight.

A further object of my invention is to provide a dirigible headlight for vehicles in which the headlight moving means is enclosed by the headlight casing whereby the casing itself protects the headlight moving means from foreign matter such as dust, dirt, and the like.

A further object of my invention is to provide a dirigible headlight for vehicles which is extremely simple in construction, and which is durable and efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a front elevation of an automobile showing the device operatively applied thereto, Figure 2 is a vertical section through one of the lights and operating means, Figure 3 is a sectional view along the line 3—3 of Fig. 2, Figure 4 is a section along the line 4—4 of Figure 2, Figure 5 is a diagrammatic sectional view of a modified form of the device, and Figure 6 is a diagrammatic plan view of Figure 5.

In carrying out my invention I make use of an automobile which is provided with standard fenders 1 and a spindle connecting rod 2. A headlight carrying bar 3 is supported by the fenders 1 and is secured thereto by means of brackets 4'.

In Figure 2 I have clearly shown how the bar 3 supports the plates 4 which are clamped thereto by means of straps 5 and bolts 6. The plates 4 have openings 7 therein and are slotted at 8 so as to permit the two portions 9 formed by the slot to be drawn together by means of a bolt 10 so as to clamp the sleeve 11 in the opening 7. In this way, the sleeve 11 is held against movement with respect to the plate 5.

A tubular member 12 is rotatably mounted in the sleeve 11 and is provided with an enlarged portion 13 that has a shoulder 14 which rests upon the top of the sleeve 11. The shoulder 14 prevents downward movement of the tubular member 12 with respect to the sleeve 11. A split ring 15 is received in a groove 16 in the tubular member 12 and bears against the under side of the sleeve 11 so as to prevent upward movement of the tubular member 12.

A headlight casing 17 is hinged to the portion 13 at 18 and is provided with an apron 19 that is adapted to slide over a spherical portion 20 of the tubular member. In Figure 2 it will be noted that the front portion of a cup-shaped member 13 is cut away at 21 so as to permit the casing 17 to swing forwardly. The headlight casing 17 is of standard construction and houses a reflector 22 and a lens 23.

In standard headlights there is a space between the reflector 22 and the back of the casing 17 which is designated by A in Figure 2. In this space I dispose a plate 24 that has a cam slot 25 therein. The slot slidably receives a pin 26 which in turn is carried by a rod 27. The rod is held against rotation by means of a pin 28 (see Figures 2 and 4) which is connected to the lower end of the rod 27 and which extends into the plate 5 as shown in Figure 4. Since the tubular member 12 rotates with respect to the rod 27, it is provided with a slot 29 so as to permit the pin 28 to slide in the slot when the tubular member 12 is rotated. The cam slot 25 is designed so as to swing the casing 17 forwardly about the pivots 18 when the casing is rotated by means of the tubular member 12. The slot 25 may be curved so as to swing the casing 17 forwardly in the desired angle.

The means for rotating the tubular members 12 comprises arms 30 which are secured to the lower ends of the tubular members 12. A split block 31 is mounted upon the spindle connecting rod 2 and is locked to the rod by means of bolts 32. The bolts 32 are connected to the arms 30 by means of links 33. The connections between the bolts 32, the arms 30, and the links 33 are ball joints so as to permit a universal movement between these members.

From the foregoing description of the various parts of the device, the operation thereof may be readily understood. The spindle connecting rod 2 forms a part of the steering mechanism of the automobile and is moved longitudinally when the steering wheel is turned. The rod 2 in moving carries with it the block 31 which in turn moves the links 33 so as to cause the arms 30 to swing the tubular members 12. The tubular member 12 is connected to the casing 17 at 18 and also is connected to the casing by means of the pin 26 and cam member 24. A rotation of the tubular member 12 will cause the hinge 18 to rotate the casing 17 and will cause the pin 26 and cam 24 to tilt the casing forwardly. Since the pivot points are so near to the bottom of the casing 17, it will require very little force to swing the casing 17 in the manner described. It should be noted that the rear portion of the cup-shaped member 13 bears against the under side of the casing 17 when the casing is in normal position. The casing will therefore be supported by the upper edge of the cup-shaped portion 13 and will relieve the strain upon the pin 26.

In Figures 5 and 6 I have shown a slightly modified form of the device in which a tubular member 40 is secured to a headlight casing 41 at 42. A stationary pin 43 is enclosed by the tubular portion 40 and has an upwardly extending portion 44 which is slidably received in a slot 45 in a cam member 46. It will be noted that the cam member 46 is in this case secured to the reflector 47 instead of to the casing as in Figure 2. The reflector is pivotally carried by the casing 41 at 48 so as to permit the reflector to swing forwardly. Operation of this form of the device is as follows: The tubular member 40 is rotated in the same manner as the tubular member 12 in Figure 2, and carries the casing 41 therewith. The casing in this instance does not swing forwardly. The reflector, however, is swung forwardly by means of the upwardly extending pin 44 which is slidably received in the cam slot 45. Since the pin 44 is held stationary, it will move the cam member 46 and reflector 47 with respect to the casing 41 so as to tilt the reflector forwardly, and thus throw the beams of light downwardly.

I claim:

1. A dirigible headlight construction comprising headlight supports adapted to be carried by an automobile, headlights carried by said supports, means for swinging said headlights in the same direction as the wheels, a reflector mounted in each headlight and means for automatically swinging said reflectors downwardly with respect to said headlights when said headlights are swung with the wheels.

2. A dirigible headlight comprising headlight supports, adapted to be carried by an automobile, headlight swinging members rotatably carried by said supports, headlights hingedly secured to said headlight swinging members, and means disposed in said headlights for automatically swinging said headlights downwardly with respect to said headlights when said headlights are swung with the wheels.

3. A dirigible headlight construction comprising headlight supports adapted to be carried by an automobile, a headlight carrying member rotatably disposed in said supports, a headlight hingedly secured to each headlight carrying member, a cam plate disposed in each headlight, a stationary finger engaging with said cam plates to tilt said headlights downwardly when said headlights are swung by said headlight carrying members.

4. A dirigible headlight construction comprising headlight supports adapted to be carried by an automobile, a headlight carrying member rotatably disposed in said support, a headlight hingedly secured to each headlight carrying member, a cam plate disposed in each headlight, a stationary finger engaging with said cam plates to tilt said headlights downwardly when said headlights are swung by said headlight carrying members, and means operatively connecting said headlight carrying members with the steering mechanism of an automobile.

5. A dirigible headlight construction comprising headlight supports adapted to be carried by an automobile, a hollow headlight carrying member rotatably disposed in said supports, a headlight rigidly secured to each headlight carrying member, a rod disposed in said hollow headlight carrying members, means for rigidly securing said rods to said supports, a pin carried by each of said rods, and means cooperating with said pins disposed in said headlights for automatically swinging said headlights downwardly when said headlights are swung with the wheels.

JAMES M. CALKINS.